3,798,212
RESOLUTION OF BENZODIAZEPINE
DERIVATIVES
Giancarlo Jommi, Milan, Francesco Mauri, Sesto San
Giovanni, and Giovanna Riva, Milan, Italy, assignors
to Ravizza S.A., Lausanne, Switzerland
No Drawing. Filed June 16, 1971, Ser. No. 153,851
Claims priority, application Great Britain, June 25, 1970,
30,851/70
The portion of the term of the patent subsequent to
Apr. 4, 1972, has been disclaimed
Int. Cl. C07d 53/06
U.S. Cl. 260—239.30       7 Claims

ABSTRACT OF THE DISCLOSURE

The invention relates to the resolution into optical antipodes of racemic compounds of the general formula:

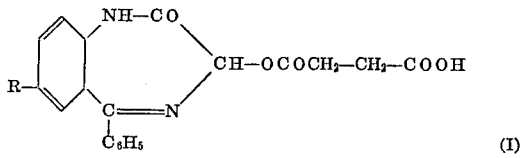

wherein R is $NO_2$, Cl, F or Br by differential solubility in acetone containing a small percentage of water of the corresponding salts with (+)ephedrine or (−)ephedrine.

---

The invention relates to the resolution into optical antipodes of racemic compounds of the general formula:

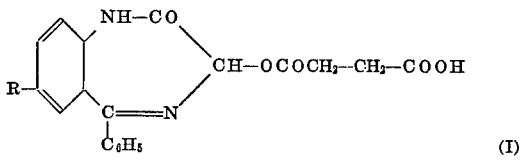

wherein R is $NO_2$, Cl, F or Br. For the sake of simplicity compounds of Formula I will be identified as 7-$NO_2$-hemisuccinate, 7-Br-hemisuccinate and so on.

The racemic hemisuccinates of Formula I show very valuable activity on the central nervous system. They readily form salts on neutralization with an equimolecular amount of an organic or inorganic base and are thus transformed into water soluble hemisuccinates. These aqueous solutions can be administered by parentheral route (unlike other benzodiazepines) which give immediate therapeutic effect, particularly with the sodium hemisuccinates.

The racemic hemisuccinates may easily be prepared by esterification of the corresponding 3-hydroxy derivatives with succinic anhydride, preferably in the presence of pyridine, or of another tertiary base in such an amount to act also as a reaction medium.

Of the two optically active isomers which constitute the racemic hemisuccinates of Formula I, the dextro-rotatory form is far more active than the levorotatory.

Our cognate patent specification No. 22,673 describes and claims a process for the resolution of the racemic hemisuccinates by forming salts with (+)ephedrine or (−)ephedrine and separating them by taking advantage of their sharply different solubilities in ethyl acetate.

The present invention provides a process for the resolution of the racemic hemisuccinates of Formula I in a simple and economical manner by differential solubility in acetone containing a small percentage of water leading to the dextrorotatory hemisuccinate in high yields. The levorotatory hemisuccinates may also be recovered in high yields, hydrolyzed to the racemic 3-hydroxy- compounds, re-esterified to the racemic hemisuccinates and so recycled.
The process is based on the discovery that the salts of the (+)hemisuccinates and (−)hemisuccinates with (+)ephedrine or (−)ephedrine have sharply different solubilities in acetone. The salts formed by the (+)hemisuccinates of Formula I with (−)ephedrine show a very low solubility in acetone containing a small percentage of water, while the salts of the (−)hemisuccinates with (−)ephedrine are highly soluble. The solubility of the (−)ephedrine (+)hemisuccinates in acetone is still remarkably lower in the presence of the salts (−)ephedrine (−)hemisuccinates.

Generally the percentage of water present in the acetone is from 1 to 2.

When (+)ephedrine is used as the salt forming compound, the two salts obtained show an opposite behaviour, with respect to the solubility in acetone, when compared with the salts of (−)ephedrine. That is the salts of the (+)hemisuccinates with (+)ephedrine are highly soluble in acetone, while the salts of the (−)hemisuccinates with (+)ephedrine are nearly insoluble.

The alternative of using the (−) ephedrine is preferred as to obtain the (+)hemisuccinates as a precipitate rather than as a solution gives a higher purity of the desired product. The solubility per 100 ml. of acetone containing 1% of water at room temperature of the most important among the compounds considered are:

Racemic 7-Cl-hemisuccinate _____ 8 g.
(−)ephedrine(+)7 - Cl - hemisucci- Below 0.144 g.
  nate.
(−)ephedrine(−)7 - Cl - hemisucci- Above 57.0 g.
  nate.
(−)ephedrine(+)7 - Cl - hemisucci- [1] Below 0.072 g.
  nate.
Racemic 7-$NO_2$-hemisuccinate _____ 13.7 g.
(−)ephedrine(+)7 - $NO_2$ - hemisuc- Below 0.025 g.
  cinate.
(−)ephedrine(−)7 - $NO_2$ - hemisuc- Above 71.2 g.
  cinate.
(−)ephedrine(+)7 - $NO_2$ - hemisuc- [2] Below 0.012 g.
  cinate.

[1] In 100 ml. acetone containing 1% water and 5.70 g. of (−)ephedrine(−)hemisuccinate.
[2] In 100 ml. acetone containing 1% water and 6.55 g. of (−)ephedrine(−)hemisuccinate.

Taking advantage of this solubility in acetone the following industrial process has been set up. The racemic hemisuccinatees and the (−)ephedrine are made to react at room temperature in acetone containing about 1% of water, the amount of the solvent being such to be sure that the whole (−)ephedrine(−)hemisuccinate salt formed remains in solution, taking into account the solubility of the various salts in the solvent. To operate with a salt concentration of from 10 to 15% is generally appropriate. The (−)ephedrine(+)hemisuccinate precipitates nearly quantitatively from the solution, with stirring, in a few minutes.

The crystalline precipitate formed is filtered off, dissolved in a solvent and hydrolyzed with an acid.

According to a preferred embodiment of the invention the hydrolysis is carried out with acetic acid which acts both as a solvent and as a hydrolysing agent. Acetic acid does not cause any yellowing of the product as mineral acids do. By dilution with water up to incipient crystallization and subsequent cooling, the pure (+)hemisuccinate crystallizes out, is dried and may be recrystallized from a solvent such as dioxan. In order to render the process economically more convenient, it is preferred to recover the (−)hemisuccinate contained in the solution, in the form of salt with ephedrine. To perform such a recovery, the acetone solution from which the crystals of (−)ephedrine(+)hemisuccinate have been removed is treated with water containing a small percentage of a strong alkali with stirring in order to hydrolise the (—)ephedrine(—)hemisuccinate. The solution is then acidified to precipitate the insoluble 3-hydroxy compound. Preferably concentrated sodium hydroxide is used as the strong alkali and acetic acid as acidifying medium. The separation of (+)hemisuccinates and (—)hemisuccinates can also be carried out through the salts with (+)ephedrine by following the above technique with only the obvious variations. This method is less convenient owing to the (+)ephedrine(+)hemisuccinate salt remaining in solution being removable only with lower yields and with a lower degree of purity. The invention includes pharmaceutical compositions containing (+)benzodiazephine-hemisuccinates prepared according to the process of the invention, in admixture with a therapeutically acceptable diluent or carrier.

The invention is illustrated by the following examples.

EXAMPLE 1

1.7 g. of (—)ephedrine dissolved into 5 ml. of acetone are added to 50 ml. of acetone containing 0.5 ml. of water wherein 4 g. of racemic 7-Cl-hemisuccinate have been dissolved. The whole is stirred for 15 minutes and the crystalline precipitate formed is filtered off, washed with 10 ml. of acetone and dried. 2.70 g. of (—)ephedrine (+)7-Cl-hemisuccinate were obtained (theoretical 2.85 g, yield 95%), having $[\alpha]_D=+126°$ (c.=3% in dimethylformamide).

This 2.70 g. of (—)ephedrine(+)7-Cl-hemisuccinate are dissolved at 50° C. in 10 ml. of glacial acetic acid and mixed with 30 ml. of water. A crystalline mass of (+)7-Cl-hemisuccinate forms, which after filtration and drying weighs 1.6 g. (theoretical 2 g.—yield 80%). The anhydrous salt has the following characteristics:

M.P.=178° C; $[\alpha]_D=+173°$ (c.=1% in dioxan)
$C_{19}H_{15}N_2ClO_5$: M.W. 386.8. Analysis—Calc.: C, 58.95; H, 3.90; N, 7.23, Found: C, 58.79; H, 3.85; N, 7.31

The residual acetone solution is mixed with 50 ml. of water containing 1.7 ml. of 9 N sodium hydroxide and the whole is stirred for an hour. The solution is acidified with acetic acid and the precipitated product filtered off and dried. 1.1 g. of racemic 3-hydroxy-compound are obtained (theoretical 1.48 g., yield 75%) having a melting point of 212° C.

EXAMPLE 2

1.7 g. of (—)ephedrine dissolved into 5 ml. of acetone are mixed with 4 g. of racemic 7-NO$_2$-hemisuccinate dissolved in 40 ml. of acetone containing 0.4 ml. of water. The whole is stirred for 15 minutes. A crystalline precipitate forms and is filtered off, washed with 10 ml. of acetone and dried. 2.55 g. of (—)ephedrine (+)7-NO$_2$-hemisuccinate are obtained (theoretical 2.8 g., yield 91%) having $[\alpha]_D=+285°$ (c.=3% in dimethylformamide). This 2.55 g. of (—)ephedrine (+)7-NO$_2$-hemisuccinate dissolved in 10 ml. of acetic acid at 50° C. are mixed with 30 ml. of water and allowed to crystallize. 1.8 g. of (+)7-NO$_2$-hemisuccinate are recovered (yield 90%). The dry product has the following characteristics:

M.P. 156° C; $[\alpha]_D=+414°$ (c.=2% in dioxan)
$C_{19}H_{15}N_3O_7$: N.W. 397.25. Analysis—Calc.: C, 57.43; H, 3.80; N, 10.58. Found: C, 57.44; H, 3.56; N, 10.70

The efficacy indexes of the most important compounds prepared according to the invention are set out in our earlier patent specification numbered above.

The acetonic mother liquor, mixed with 50 ml. of water and 1.7 ml. of 9 N sodium hydroxide, is stirred for 1 hour.

Acetic acid is added up to acidify. Racemic 3-hydroxy derivative precipitates, is filtered and after drying weighs 1.3 g. (yield 86%).

We claim:
1. A process of producing the dextro-rotatory form of a compound of the formula

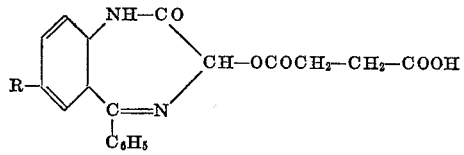

wherein R is NO$_2$, Cl, F or Br, which comprises forming salts of the appropriate racemic compound with (+) or (—)ephedrine, separating the salts produced by differential solubility in acetone, containing 1 to 2% of water, and hydrolising at least the desired salt.

2. A process according to claim 1 in which the salts are separated in acetone containing 1–2% of water at room temperature.

3. A process according to claim 1 in which a salt concentration of from 10 to 15% is used.

4. A process according to claim 1 in which the hydrolysis is carried out with acetic acid.

5. A process according to claim 1 in which the (—)hemisuccinate is recycled by hydrolysis to the racemic 3-hydroxy compound and re-esterification.

6. A process according to claim 5 in which the hydrolysis, to the 3-hydroxy racemic form is carried out with concentrated sodium hydroxide.

7. A process of producing the dextro-rotatory form of a compound of formula

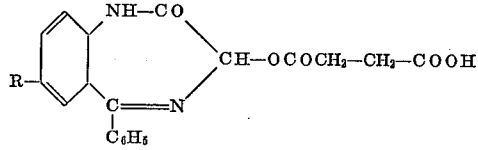

wherein R is NO$_2$, Cl, F or Br, which comprises forming, at room temperature, salts of the appropriate racemic compound with (+) or (—)ephedrine in acetone containing 1 to 2% of water, separating the salts produced by differential solubility in acetone containing 1 to 2% of water, and hydrolysing at least the desired salt.

References Cited

UNITED STATES PATENTS 3,654,267   4/1972   Jommi et al. _____260—239.3 D

HENRY R. JILES, Primary Examiner

R. J. BOND, Assistant Examiner

U.S. Cl. X.R.

424—244